United States Patent [19]

Pavlath

[11] Patent Number: 4,976,506
[45] Date of Patent: Dec. 11, 1990

[54] METHODS FOR RUGGED ATTACHMENT OF FIBERS TO INTEGRATED OPTICS CHIPS AND PRODUCT THEREOF

[76] Inventor: George A. Pavlath, 3513 Calle Quebracho, Thousand Oaks, Calif. 91360

[21] Appl. No.: 310,336
[22] Filed: Feb. 13, 1989
[51] Int. Cl.$^5$ ............................................. G02B 6/30
[52] U.S. Cl. ................................ 350/96.17; 350/96.2
[58] Field of Search ................. 350/96.2, 96.11, 96.15, 350/96.17

[56] References Cited

U.S. PATENT DOCUMENTS

| 3,949,318 | 4/1976 | Zeidler | 350/96.17 |
|---|---|---|---|
| 4,186,994 | 2/1980 | Denkin et al. | 350/96.17 |
| 4,714,315 | 12/1987 | Krause | 350/96.2 |
| 4,744,619 | 5/1988 | Cameron | 350/96.17 |
| 4,759,595 | 7/1988 | Boord et al. | 350/96.13 |
| 4,763,979 | 8/1988 | Wang | 350/96.2 |
| 4,784,454 | 11/1988 | Dyott | 350/96.2 |

FOREIGN PATENT DOCUMENTS

| 60-95409 | 5/1985 | Japan | 350/96.17 |
|---|---|---|---|
| 63-216009 | 9/1988 | Japan | 350/96.17 |
| 63-231406 | 9/1988 | Japan | 350/96.17 |
| 63-311213 | 12/1988 | Japan | 350/96.17 |
| 1-29809 | 1/1989 | Japan | 350/96.17 |

Primary Examiner—John D. Lee
Assistant Examiner—John Ngo

[57] ABSTRACT

Methods are disclosed for providing a rugged attachment of an optical fiber to an integrated optics chip. A first plate is attached to a first surface of the chip, the thickness of the chip is reduced to a value less than the diameter of the fiber but of sufficient optical thickness so that the evanescent field of a guided mode is negligible outside the chip, a second plate is attached to a second major surface of the reduced-thickness chip, the fiber is coaxially jacketed with a material suitable for attachment to the first and second plates, the fiber is positioned with respect to a waveguide on the chip, and the jacket of the fiber at its end face is symmetrically attached to both the first and second plates at a plurality of locations. Alternatively, a single plate can be attached to the first surface of the chip without reducing the thickness of the chip and either a jacket on the fiber or the curved periphery of the fiber itself can be attached symmetrically to both the plate and the substrate. The resulting connection between the optical fiber and the integrated optics chip is rugged, thermally insensitive, and suited for batch production processes. A wafer comprising a plurality of chips can be sandwiched between first and second plates or reinforced with a single plate, and subsequently subdivided into individual chips to which optical fibers can then be attached.

12 Claims, 7 Drawing Sheets

METHODS FOR RUGGED ATTACHMENT OF FIBERS TO INTEGRATED OPTICS CHIPS AND PRODUCT THEREOF

BACKGROUND OF THE INVENTION

1. Field of the Invention

The invention relates generally to fiberoptic devices and techniques and, more particularly, to methods for attaching fibers to integrated optics chips and the devices resulting from such methods.

2. Description of the Related Art

Short lengths of optical fibers called "pigtails" are bonded to integrated optics chips to aid in coupling to devices on the chips. Once installed, a pigtail allows fiber-to-fiber splicing to be carried out.

Previous methods for attaching optical fibers to integrated optics chips involve the use of epoxy adhesives or metal-to-metal welding. An example of the latter is the method disclosed in U.S. Pat. application Ser. No. 006,164, entitled "Microattachment of Optical Fibers," filed Jan. 23, 1987, (now U.S. Pat. No. 4,788,406) and assigned to the assignee of the present invention, which application is hereby incorporated by reference herein.

Epoxy bonds tend to be limited by the characteristics of the epoxy (for example, by changes in light-transmitting and mechanical properties in the desired operating temperature range), are slow to set up, and are difficult to use in an automated production environment. Past methods of metal-to-metal welding have involved structurally asymmetric attachment arrangements which result in undesirably high thermal sensitivities of the optical splices. In an asymmetric attachment, the disparity in coefficients of thermal expansion between adjacent dissimilar materials results in thermally-induced stresses on the fiber. It would be a great advance in the art of attaching optical fibers to integrated optics chips if a method could be found which is suited for batch processing and provides a joint which is symmetric and thermally insensitive.

SUMMARY OF THE INVENTION

A method for providing a rugged attachment of an optical fiber to an integrated optics chip comprises attaching a first plate to a first major surface of the chip substrate on which the optical circuits reside, removing material from a second major surface of the chip to leave a chip thickness smaller than the diameter of the fiber to be attached to the chip but of sufficient optical thickness so that the evanescent field of a guided mode has a negligibly small value outside the chip, attaching a second plate to a second major surface of the reduced-thickness chip, coaxially jacketing an end portion of the fiber with a material suited for attachment to the first and second plates, positioning an end face of the fiber with respect to the chip so that the fiber is properly optically coupled to a desired portion of an end face of the chip, and attaching the jacket of the fiber end face symmetrically to both the first and second plates at a plurality of locations.

Alternatively, a single plate can be attached to the first major surface of the chip without reducing the thickness of the chip, and the jacket of the fiber end face can be attached symmetrically to both the plate and the chip substrate at a plurality of locations. In this embodiment the material of the plate must be the same as the material of the chip substrate. In a variation on this alternative embodiment, the single plate and the chip substrate comprise materials which are suitable for attachment to the curved periphery of an unjacketed fiber, so that the fiber itself can be symmetrically attached to the plate and the substrate at a plurality of locations.

The resulting connection between the optical fiber and the integrated optics chip is rugged, thermally insensitive, and suited for batch production processes. In particular, a wafer comprising a plurality of chips can be sandwiched between first and second plates or reinforced with a single top plate, and subsequently subdivided into individual chips to which optical fibers are then attached by the method disclosed.

Techniques of attaching the sandwiching plates or reinforcing plate include using an adhesive, anodic bonding, and laser welding. Jacketing of the optical fiber can be accomplished either by sliding an end of the fiber into a coaxial sleeve of the jacketing material or by coating an end portion of the fiber with a coaxial layer of the material. Suitable coating procedures include electroplating, electroless deposition, vapor deposition, and the application of the coating material in liquid form.

In the embodiment in which the integrated optics chip is reduced in thickness, removal of material from the chip can be done by polishing. Monitoring of the thickness of the chip during the polishing process can be effected in a variety of ways including electro-acoustic techniques.

BRIEF DESCRIPTION OF THE DRAWINGS

The various features and advantages of the present invention will become apparent from the following detailed description taken together with the accompanying drawings, in which.

DESCRIPTION OF THE PREFERRED EMBODIMENTS

Figure 1:
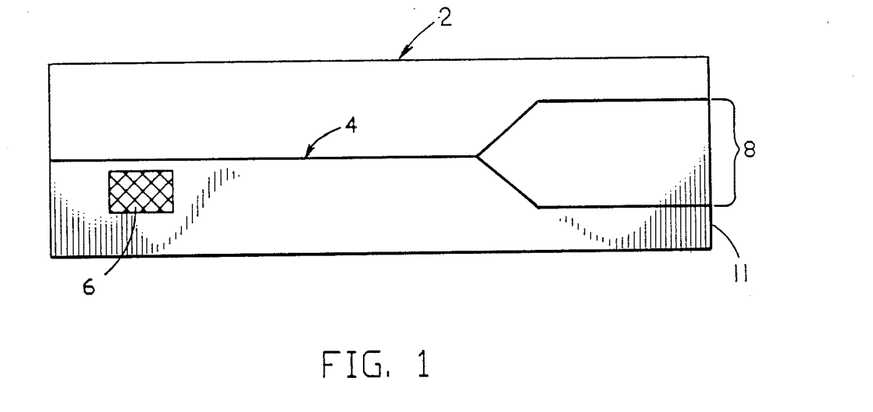
FIG. 1 is a top plan view of an integrated optics chip which is to be pigtailed; the chip contains a Y circuit typically used in fiberoptic gyroscopes.

FIG. 1 shows a top plan view of an integrated optics (IO) chip 2, which is to be pigtailed, comprising an optical Y circuit 4 on a substrate. The Y optical circuit 4 is of a type typically used in fiberoptic gyroscopes. The standard circuit has an acoustic transducer 6 placed in an unused portion of the chip 2. Transducer 6 consists of an electrode pattern which is designed to launch acoustic waves into the substrate of chip 2 over a broad bandwidth (a few hundred MHz to 1 GHz). Such an electrode pattern is deposited via conventional photo-lithographic and vacuum deposition techniques on the substrate of the chip. The spacing 8 between the branches of Y circuit 4 at an end face 11 of chip 2 is typically on the order of 200 to 400 micrometers.

Figure 2:
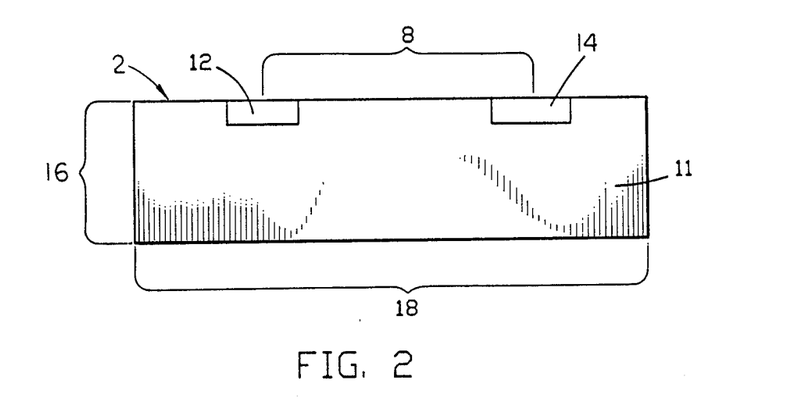
FIG. 2 is an end elevational view of the chip of FIG. 1.

FIG. 2 shows an end elevational view of IO chip 2 as seen from the right in FIG. 1. Optical waveguide end faces 12 and 14 are the terminations of the two branches of Y circuit 4 at the end face 11 of chip 2. In these figures the center-to-center distance 8 can be about 350 micrometers, the height 16 of chip 2 can be about 1 mm, and the width 18 of chip 2 can be about 3 mm.

Figure 3:
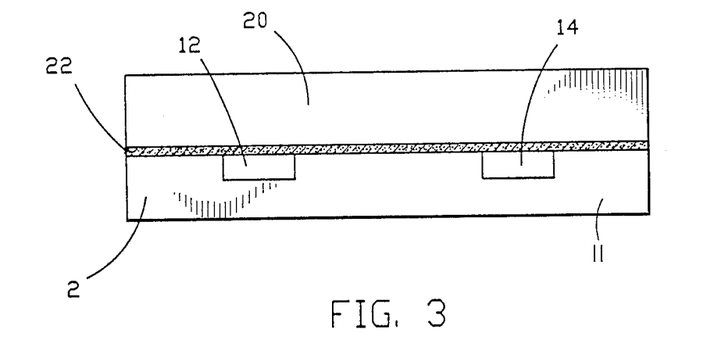
FIG. 3 is an end elevational view of an integrated optics chip with a first plate attached in accordance with the invention using an epoxy adhesive.

The first step in a method for providing rugged attachment of an optical fiber to integrated optics chip 2 is to attach a suitable glass, ceramic, or metal plate 20 to the top surface of chip 2 as shown in FIG. 3, substantially flush with end face 11. Various bonding techniques which include the use of epoxy glues and anodic techniques can be employed. The use of an epoxy adhesive to bond plate 20 to the top surface of chip 2 is illustrated in FIG. 3, where reference numeral 22 represents a thin layer of adhesive between plate 20 and chip 2.

Figure 4:
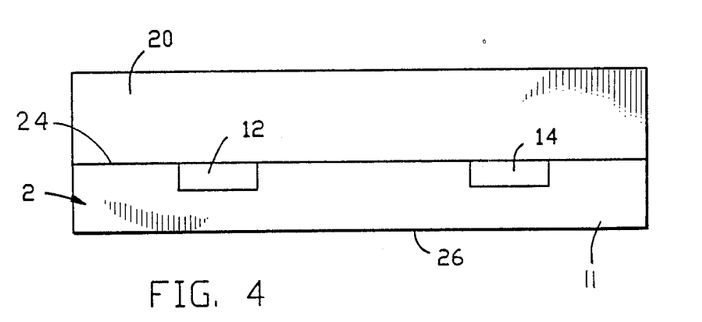
FIG. 4 is an end elevational view of an integrated optics chip with a first plate attached according to the invention using an anodic bonding technique.

FIG. 4 illustrates the use of an anodic bonding technique to join plate 20 with chip 2. In anodic bonding, a suitable dielectric buffer layer 24 is deposited on the top surface of chip 2. Dielectric film 24 is typically about 5,000 angstroms thick. A metal plate can then be bonded to dielectric film 24 by applying pressure between the plate and the film and simultaneously applying an electric field to produce migration of metal atoms into the film.

The next step in the process of the invention is to reduce the thickness of chip 2 by removing material from bottom surface 26. One method for doing this would be to polish bottom surface 26. The resulting thickness should be less than a fiber diameter but should be of sufficient optical thickness to contain the guided mode with negligible "leakage" from the waveguide. In other words, the evanescent field of the guided mode should have negligible strength outside the bottom surface 26 of chip 2, where "negligible" means that the light loss can be tolerated in a particular application.

Figure 5:
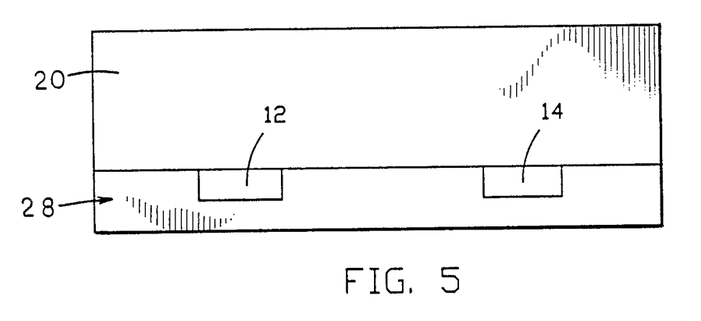
FIG. 5 is an end elevational view of a chip with plate attached after polishing of the chip to remove material.

FIG. 5 shows an end elevational view of a plate-chip combination with reduced-thickness chip 28 having a final thickness of about 10 micrometers. The thickness of reduced-thickness chip 28 can be measured by determining the acoustic resonance frequencies of the transducer deposited in the beginning of the process or by several other techniques.

Figure 6:
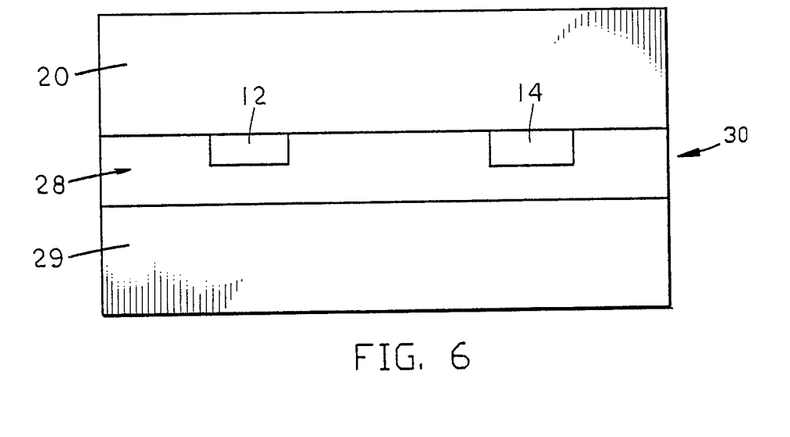
FIG. 6 is an end elevational view of an integrated optics chip with a second plate attached to the chip after its thickness has been reduced.

Next, as shown in FIG. 6, a second metal, glass, or ceramic plate 29 similar in dimensions to first plate 20 in dimensions is attached to the bottom surface of reduced-thickness IO chip 28 using the same technique as was used to attach first plate 20. The resulting sandwiched chip 30 is then ready for attachment of an optical fiber.

Figure 7:
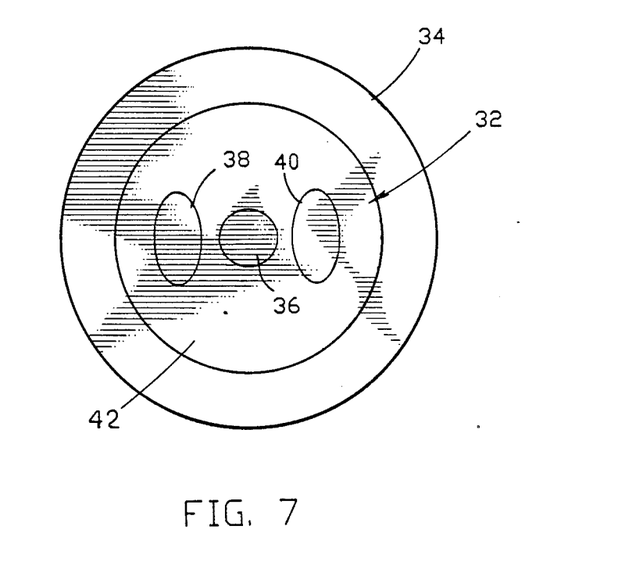
FIG. 7 is an end elevational view of an optical fiber jacketed according to the present invention.

Before attachment to sandwiched chip 30, an optical fiber 32 is prepared as follows. As shown in FIG. 7, which is an end view of a fiber prepared for chip attachment, the outer surface of fiber 32 must be coated with a material that is capable of being laser welded, E-beam welded, or otherwise attached to plates 20 and 29 which form a sandwich of reduced-thickness chip 28. The metal, glass, or ceramic jacket 34 can be formed on fiber 32 in a variety of ways. Jacket 34 may be flush with the end of fiber 32 or it may protrude beyond the end in a clip-like structure. The fiber shown in Fib. 7 is a particular type of polarization maintaining (PM) fiber (Corning PRSM (for "polarization retaining single-mode")) but any type of fiber can be used in general with this technique. Fiber core 36 and stress members 38 and 40 are contained in cladding 42 of fiber 32.

Figure 8:
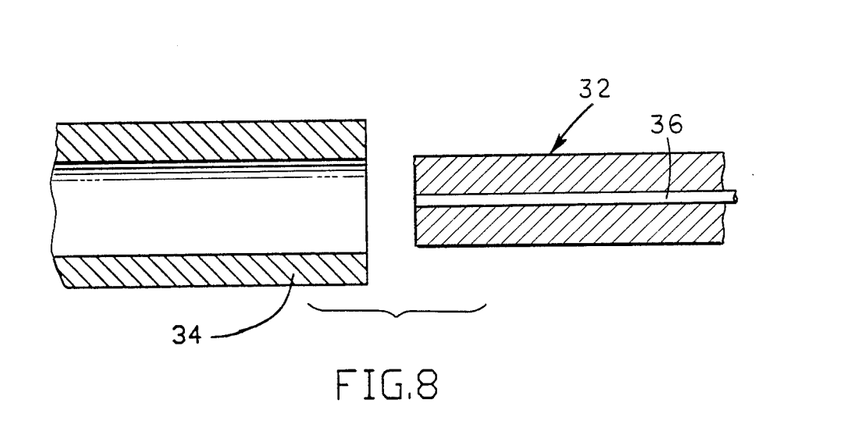
FIG. 8 is a side elevational view, in section, of an optical fiber end being inserted into a sleeve of jacketing material.

In the case of a metal jacket, a jacket coating 34 can be applied by a vapor transport process (such as by evaporation), by electroplating, by an electroless process, or by fitting a coaxial sleeve of the metal over the fiber. A coaxial sleeve arrangement also works well with other materials such as glasses, plastics, or ceramics. FIG. 8 is a side view, in section, of an optical fiber end being inserted into a sleeve of jacketing material.

Figure 9:
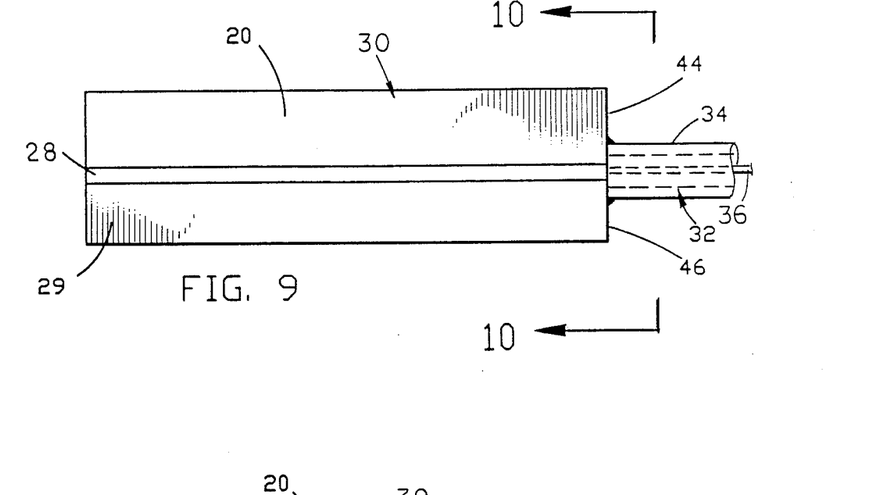
FIG. 9 is a side elevational view of a jacketed optical fiber attached to an end face of a sandwiched integrated optics chip according to the present invention.
Figure 10:
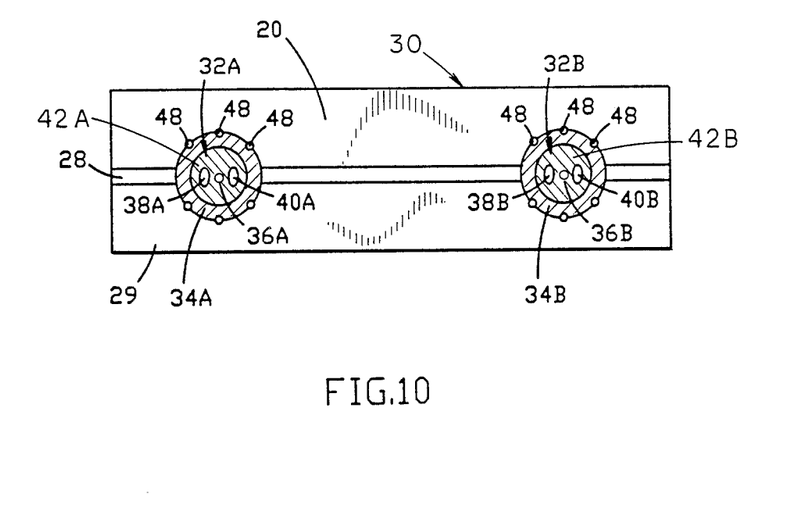
FIG. 10 is a sectional view as indicated in FIG. 9.

As shown in the side view of FIG. 9, a jacketed fiber end face is next positioned adjacent a narrow end face of sandwiched chip 30 so that light from a waveguide 12 can properly transmit light to or receive light from fiber core 36. The end of jacket 34 on fiber 32 is then joined (for example, by welding) to the narrow end faces 44 and 46 of top plate 20 and bottom plate 29, respectively. The welding is done symmetrically with respect to a plane through the center of fiber 32 parallel to either surface of chip 28. One possible symmetric pattern of welds is shown in the sectional view of FIG. 10. The plurality of symmetrical welds 48 comprise a rugged attachment of fiber 32 to chip 28 which will not result in thermal stresses on either fiber 32 or chip 28 when the ambient temperature changes.

The technique described above is well suited to attaching fibers to single-crystal integrated optics chips such as those made of lithium niobate (LiNbO$_3$), gallium arsenide (GaAs), and potassium titanyl phosphate (KTP). An alternative technique in accordance with the invention can be used for attaching a fiber (jacketed or unjacketed) to a glass substrate. In this alternative process the attachment of only a top plate is required, as shown in FIG. 3. The step of polishing the bottom surface of the substrate to remove material is unnecessary, as is attachment of a bottom plate.

Figure 11:
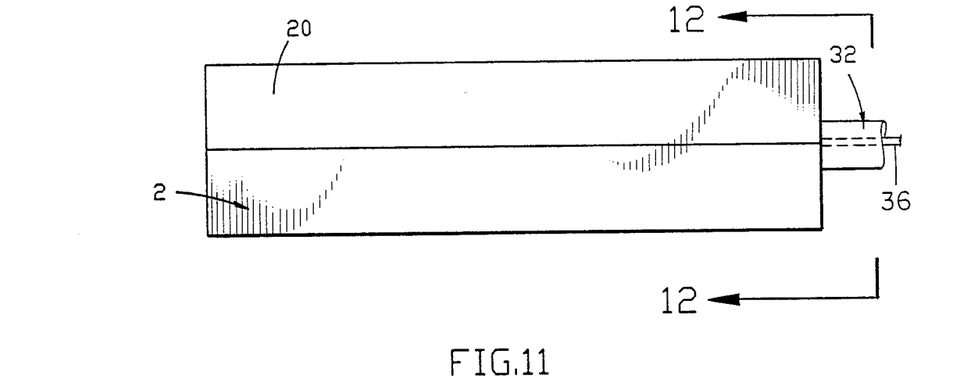
FIG. 11 is a side elevational view of a jacketed optical fiber attached to a reinforced integrated optics chip according to the present invention.
Figure 12:
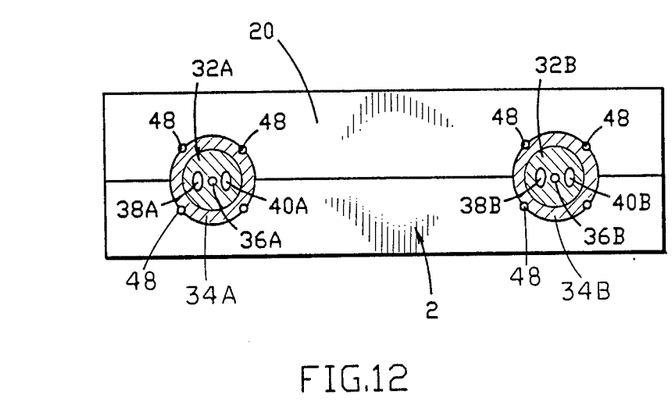
FIG. 12 is a sectional view as indicated in FIG. 11.

FIG. 11 shows a side elevational view of chip substrate 2 reinforced with a top plate 20, and an optical fiber 32 (jacketed or unjacketed) positioned next to substrate 2 and plate 20 in preparation for attachment. In the sectional view of FIG. 12, optical fiber jackets 34a and 34b are shown attached to top plate 20 and substrate 2 by a plurality of welds 48 at symmetrical locations with respect to a plane parallel to the top surface of substrate 2 which passes through the centers of fiber cores 36a and 36b. The fibers 32a and 32b in this alternative technique need not be jacketed if their curved surfaces are made of a material which can be directly attached to top plate 20 and chip substrate 2.

The methods described above produce stable, thermally rugged and symmetric attachments between IO chips and coated or uncoated optical fibers.

Fibers and waveguides can be of any type including rib waveguides. For a rib waveguide or an electroded chip, a layer is placed on the top surface of the chip, and perhaps polished, to assure a flat surface for attachment of a top plate.

The processes of the invention can be carried out on chips and on wafers. A wafer comprising a plurality of integrated optics chips can be attached to a top plate, reduced in thickness, and then attached to a bottom plate as described above. The sandwiched, reduced-thickness wafer can subsequently be cut into individual IO chips for attachment of optical fibers in the manner described above.

Figure 13:
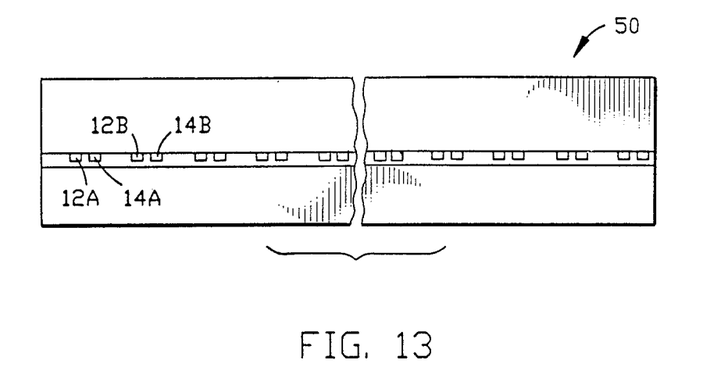
FIG. 13 is an end elevational view of a sandwiched integrated optics wafer.
Figure 14:
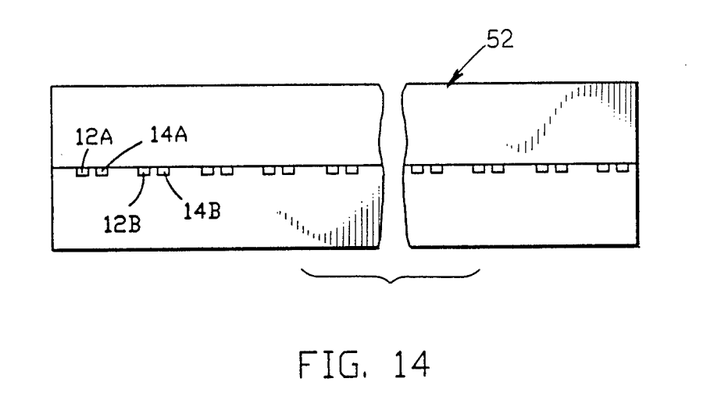
FIG. 14 is an end elevational view of a reinforced integrated optics wafer.

FIG. 13 is a side elevational view of a sandwiched wafer 50 before subdivision into individual chips. Similarly, a wafer comprising a plurality of IO chips on a glass substrate can be attached to a single top plate without being reduced in thickness, as shown in FIG. 14. The resulting reinforced wafer 52 can then be cut into a plurality of individual IO chips to which optical fibers can be attached by the methods described above. These wafer methods are well suited for fabrication on a production basis.

The rugged optical fiber attachments and thermally insensitive connections produced in accordance with the invention are well matched to single-crystal and amorphous IO substrates. The choice of material for the top and bottom plates covers a wide range (glasses, ceramics, and metals), with the bonding technology being chosen for the particular selections of plate and substrate materials. Since the bonding methods can be applied to chips or wafers, fabrication of chip-fiber devices can be done readily at high rates of production. The techniques described above permit rapid attachment of multiple fibers to a single end face of an integrated optics chip. The multiple fibers can be located in close proximity to each other, a feature which is vitally important for fiber optic gyroscope manufacture.

The above-described embodiments of the invention are furnished as illustrative of its principles, and are not intended to define the only embodiments possible in accordance with our teaching. Rather, the invention is to be considered as encompassing not only the specific embodiments shown, but also any others falling within the scope of the following claims.

What is claimed is:

1. An optical device comprising:
   an integrated optics chip having a substrate with at least one waveguide on a first surface thereof, a first plate with a first surface thereof attached to said first surface of said chip, and a second plate with a first surface thereof attached to a second surface of said chip opposite said first surface thereof, said first and second plates having end faces which extend substantially to each end face of said chip through which light coming from and leaving each said waveguide would exit and enter said chip; and
   at least one optical fiber, each said fiber having an end face positioned adjacent said waveguide at one of said end faces of said chip so that said fiber can properly transmit light to and receive light from said waveguide, said fiber having a coaxial jacket on at least a portion thereof adjacent said fiber end face attached to said first and second plates at a plurality of symmetrical locations.

2. The device of claim 1 wherein said locations are symmetrically disposed with respect to the central plane of said chip, said plane being parallel to said first and second surfaces of said chip.

3. An optical device comprising:
   an integrated optics chip having a substrate with at least one waveguide on a first surface thereof, and having a first plate with a first surface thereof attached to said first surface of said chip so that an end face of said first plate extends substantially to an end face of said chip on which said waveguide ends; and
   at least one optical fiber, each said fiber having an end face positioned adjacent a location of each said at least one waveguide at one of said end faces of said chip so that said fiber can properly transmit light to and receive light from said waveguide, said fiber having a coaxial jacket on at least a portion thereof adjacent said fiber end face attached to said first plate and to said substrate at a plurality of symmetrical locations.

4. The device of claim 3 wherein said locations are symmetrically disposed with respect to the plane in which said first surface of said chip substantially lies.

5. An optical device comprising:
   an integrated optics chip having a substrate with at least one waveguide on a first surface thereof, and having a plate with a first surface thereof attached to said first surface of said chip so that an end face of said plate extends substantially to an end face of said chip on which said waveguide ends; and
   at least one optical fiber, each said fiber having an end face positioned adjacent a location of said waveguide in said end face of said chip so that said fiber can properly transmit light to and receive light from said waveguide, said fiber having an outer core of material attached to said plate and to said substrate at a plurality of symmetrical locations.

6. The device of claim 5 wherein said locations are symmetrically disposed with respect to the plane in which said first surface of said chip substantially lies.

7. A sandwiched wafer comprising a plurality of integrated optics chips on a first surface of a substrate, fabricated as an intermediate product before optical fibers are attached to individual chips comprising:
   a wafer having a substrate with said first surface of said substrate attached to a first surface of a first plate and a second surface opposite said first surface thereof attached to a first surface of a second plate, said substrate having a thickness less than a diameter of an optical fiber to be attached, said first plate and second plate forming not part of an optical waveguide in said wafer.

8. The wafer of claim 7 wherein said substrate is of sufficient optical thickness so that the evanescent field of a guided mode is negligibly small outside said chip.

9. A connection between an optical fiber having a coaxial jacket on at least a portion thereof adjacent an end face and a sandwiched integrated optics chip with first and second plates attached to first and second opposite surfaces thereof comprising:
   a plurality of attachments between an end of said jacket and first and second end faces of said first and second plates, respectively.

10. The connection of claim 9 wherein said attachments are symmetrically located with respect to the plane in which said first surface of said chip substantially lies.

11. A connection between an optical fiber having a coaxial jacket on at least a portion adjacent an end face thereof and a reinforced integrated optics chip having a substrate with a first surface thereof attached to a first surface of a plate, said substrate having a first end face, and said plate having a first end face, comprising:
a plurality of attachments between said end face of said jacket and said first end faces of said substrate and said plate, respectively.

12. The connection of claim 11 wherein said attachments are symmetrically located with respect to the plane in which said first surface of said substrate substantially lies.

* * * * *

UNITED STATES PATENT AND TRADEMARK OFFICE
CERTIFICATE OF CORRECTION

PATENT NO. : 4,976,506

DATED : December 11, 1990

INVENTOR(S) : George A. Pavlath

It is certified that error appears in the above-identified patent and that said Letters Patent is hereby corrected as shown below:

ON TITLE PAGE: , first column, below the inventor's name, insert: --Assignee: Litton Systems, Inc., Woodland Hills, California--

Signed and Sealed this

Fifteenth Day of September, 1992

Attest:

DOUGLAS B. COMER

*Attesting Officer*  *Acting Commissioner of Patents and Trademarks*